United States Patent
Pahud et al.

(10) Patent No.: US 10,304,251 B2
(45) Date of Patent: May 28, 2019

(54) VIRTUALLY REPRESENTING SPACES AND OBJECTS WHILE MAINTAINING PHYSICAL PROPERTIES

(71) Applicant: MICROSOFT TECHNOLOGY LICENSING, LLC, Redmond, WA (US)

(72) Inventors: Michel Pahud, Redmond, WA (US); Nathalie Riche, Redmond, WA (US); Eyal Ofek, Redmond, WA (US); Christophe Hurter, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 35 days.

(21) Appl. No.: 15/624,474

(22) Filed: Jun. 15, 2017

(65) Prior Publication Data
US 2018/0365897 A1  Dec. 20, 2018

(51) Int. Cl.
*G06T 19/20* (2011.01)
*G06T 19/00* (2011.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS

| 7,714,895 B2 | 5/2010 | Pretlove et al. |
| 8,401,225 B2 | 3/2013 | Newcombe et al. |

(Continued)

FOREIGN PATENT DOCUMENTS

| EP | 2887322 A1 | 6/2015 |
| WO | 2012135554 A1 | 10/2012 |
| WO | 2015075150 A1 | 5/2015 |

OTHER PUBLICATIONS

Shao, et al., "Imagining the Unseen: Stability-based Cuboid Arrangements for Scene Understanding", In Journal of ACM Transactions on Graphics, vol. 33, Issue 6, Nov. 2014, 11 pages.
(Continued)

*Primary Examiner* — Said Broome
(74) *Attorney, Agent, or Firm* — Shook, Hardy & Bacon L.L.P.

(57) ABSTRACT

Systems and techniques from displaying virtual representations of real-world spaces and objects in various environments are disclosed. A source environment at a first location can be scanned by a head-mounted display (HMD) device to generate three-dimensional datasets corresponding to the physical environment at the first location. The three-dimensional datasets can include detected physical properties associated with the physical environment. At a second location, the HMD can re-create the source environment, and render for display a virtual representation of the physical environment based on the three-dimensional datasets, where the virtual representation of the source environment is rendered to maintain any one of the detected physical properties associated with the physical environment. Further, at the second location, the HMD can enable a user to view one or more physical objects within the virtual representation of the physical environment such that the physical object is perceived to be within the source environment.

17 Claims, 11 Drawing Sheets

(51) Int. Cl.
*G06F 3/14* (2006.01)
*G06T 15/40* (2011.01)
*G06F 3/01* (2006.01)
*G06F 3/03* (2006.01)
*G06K 9/00* (2006.01)
*G02B 27/01* (2006.01)

(52) U.S. Cl.
CPC ............ *G06F 3/012* (2013.01); *G06F 3/0304* (2013.01); *G06F 3/1454* (2013.01); *G06K 9/00671* (2013.01); *G06T 15/40* (2013.01); *G06T 19/20* (2013.01); *G02B 27/0172* (2013.01); *G02B 2027/0138* (2013.01); *G02B 2027/0141* (2013.01); *G06T 2219/2016* (2013.01)

(56) References Cited

U.S. PATENT DOCUMENTS

| | | | |
|---|---|---|---|
| 9,329,469 | B2 | 5/2016 | Benko et al. |
| 9,443,353 | B2 | 9/2016 | Vaddadi et al. |
| 9,451,239 | B2 | 9/2016 | Chandaker |
| 9,645,394 | B2 | 5/2017 | Kinnebrew et al. |
| 2005/0148388 | A1* | 7/2005 | Vayra ............ A63F 13/10 463/32 |
| 2008/0071559 | A1 | 3/2008 | Arrasvuori |
| 2010/0103196 | A1 | 4/2010 | Kumar et al. |
| 2012/0233555 | A1 | 9/2012 | Psistakis et al. |
| 2014/0132629 | A1 | 5/2014 | Pandey et al. |
| 2014/0300702 | A1 | 10/2014 | Saydkhuzhin et al. |
| 2015/0161821 | A1 | 6/2015 | Mazula |
| 2015/0235434 | A1* | 8/2015 | Miller ............ G06T 19/006 345/633 |
| 2016/0189426 | A1 | 6/2016 | Thomas et al. |
| 2016/0253746 | A1 | 9/2016 | Morrison |
| 2016/0292925 | A1 | 10/2016 | Montgomerie et al. |

OTHER PUBLICATIONS

Yukich, Brett, "Creating 3D Models From Real World Objects for Personal Fabrication", https://www.cs.auckland.ac.nz/courses/compsci705s2c/assignments/reports/2014/3D Printing byuk001.pdf, 2014, 2 pages.

"International Search Report and Written Opinion Issued in PCT Application No. PCT/US2018/034032", dated Aug. 14, 2018, 16 Pages.

* cited by examiner

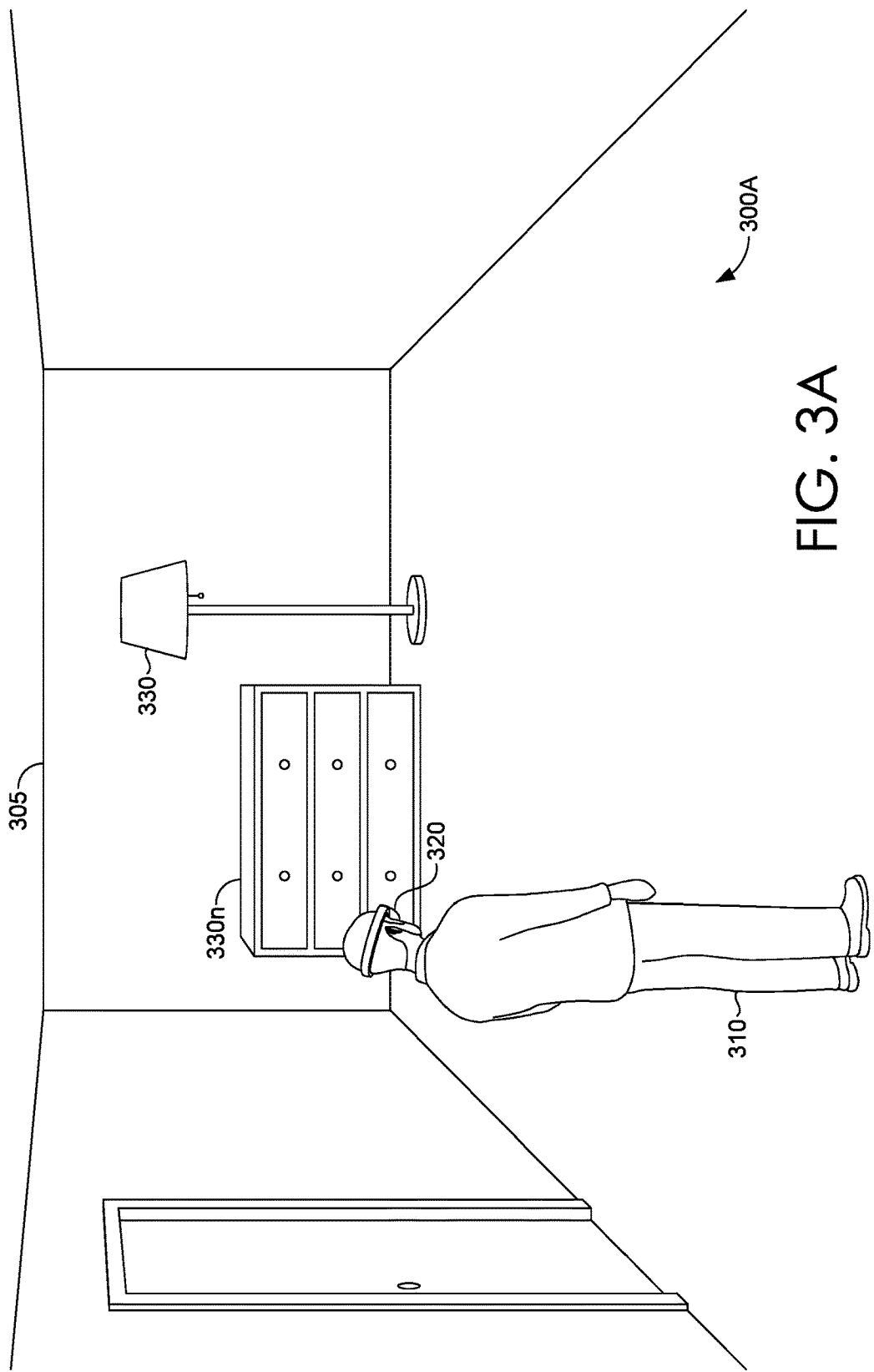

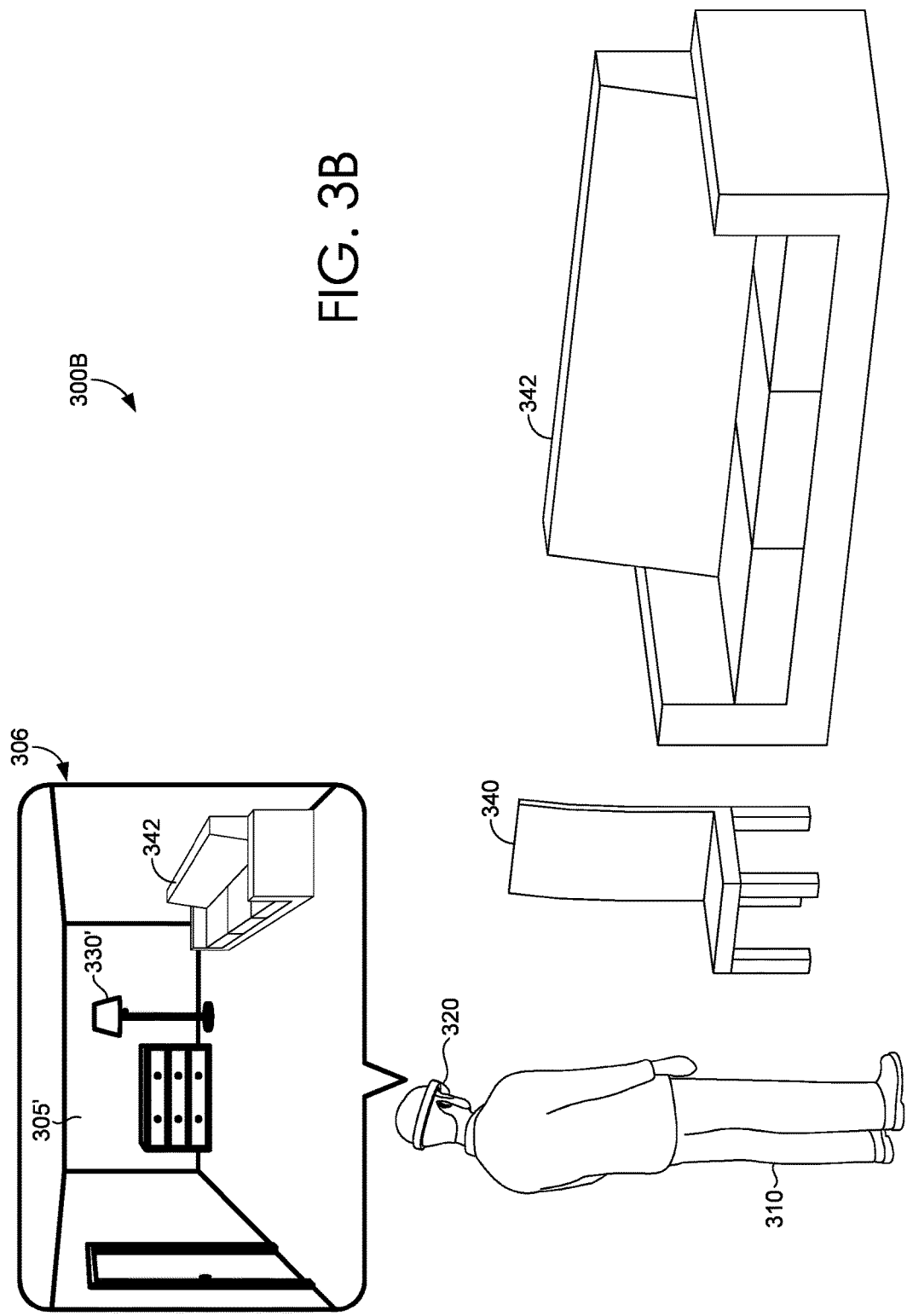

VIRTUALLY REPRESENTING SPACES AND OBJECTS WHILE MAINTAINING PHYSICAL PROPERTIES

BACKGROUND

Augmented reality or "mixed" reality technologies have been incorporated into many diverse applications across a variety of industries, including gaming, enterprise, design, and gaming, amongst others. These technologies have been incorporated into various product offerings to enhance user experience and productivity, and to provide users with capabilities not realized with previous technology offerings. One particular area of enhancement facilitated by these technologies relates to environment visualization and collaboration within those environments.

Augmented reality is a technology that essentially superimposes a computer-generated image onto a user's real-world view, such that a user of the technology can perceive a composite view including their perceived real-world view overlaid by the computer-generated image. With respect to environment visualization, augmented reality has enabled users to view virtual three-dimensional textured objects within a real-world environment. Further, augmented reality devices have enabled the sending and receiving of these three-dimensional objects between devices at different scales. Conventional systems, however, do not provide intuitive methods for capturing three-dimensional objects and segmenting them from their environment for storage or communication.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the technology described herein are directed towards capturing, storing, communicating, and/or presenting virtual representations of real-world spaces and objects in various augmented reality (AR) environments. Further, the virtual representations of the real-world spaces and objects can maintain any number of physical properties as presented in an AR environment. As such, embodiments of the technology provide techniques for capturing, and at a later time regenerating, real-world spaces and/or objects in an AR environment. Further, other embodiments of the technology described herein can facilitate collaboration in such AR environments, for example by sending and receiving virtual representations of real-world spaces and objects between devices. While the present disclosure primarily references AR as the embodied technology, other technologies such as mixed reality, holography, and virtual reality, are technologies that remain within the purview of the present disclosure.

According to some embodiments, a head-mounted display (HMD) device worn by a user, can scan a physical environment (e.g., a room) at a first location, also described herein as a source environment, and further generate a first collection of three-dimensional datasets that corresponds to the physical environment at the first location. The collection of three-dimensional datasets can be generated, for example, based on optical information obtained by one or more optical input devices coupled to the HMD. Further, the three-dimensional datasets can include detected physical properties associated with the physical environment at the first location, for example geometric, dimensional, spatial-relation, or chromatic properties. The HMD can store the datasets either locally or at a remote device (e.g., the cloud). At a second location, the HMD can re-create the source environment, by rendering for display a virtual representation of the source environment based on the collection of three-dimensional datasets, where the virtual representation of the source environment is rendered to maintain any combination of the detected physical properties associated with the physical environment. Further, the HMD can enable a user to view and scan one or more physical objects at the second location, within the virtual representation of the source environment, such that the physical object(s) are perceived to be within the source environment. To this end, a user can view a true to life comparison of the physical objects at the second location relative to the source environment, by viewing the physical objects within the virtual representation of the source environment.

In some further embodiments, the HMD can scan one or more physical objects at the second location to generate at least a second collection of three-dimensional datasets that corresponds to at least a first physical object at the second location. The collection of three-dimensional datasets can be generated, for example, based on optical information obtained by one or more optical input devices coupled to the HMD. The three-dimensional datasets corresponding to the physical object(s) can include detected physical properties associated with the physical object(s) at the second location. The HMD can then store the datasets corresponding to the physical object(s) either locally or at the remote device. Based on the collection of three-dimensional datasets, the HMD can re-create the physical object(s), and render for display a virtual representation of the physical object(s), where the virtual representation of the physical object(s) is rendered to maintain one or more detected physical properties associated with the physical object(s). In this regard, the HMD can enable a user to view one or more virtual representations of physical objects within the virtual representation of the source environment. Moreover, a user can view a true to life comparison of the physical objects at the second location relative to the source environment, by viewing the virtual representations of physical objects within the virtual representation of the source environment.

In some further embodiments, the stored three-dimensional datasets can be received and/or retrieved by the HMD, such that any number or combination of virtual representations of physical objects can be viewed at another location, such as the first location (i.e. source environment). Accordingly, the HMD can re-create a physical object, by rendering for display a virtual representation of the physical object while maintaining one or more detected physical properties associated with the physical object. As such, the HMD can enable a user to view one or more virtual representations of physical objects, from a second location, within the source environment of the first location. To this end, a user can view a true to life comparison of the physical objects at the second location relative to the source environment, by viewing the virtual representation(s) of physical object(s) within the source environment.

Additional objects, advantages, and novel features of the invention will be set forth in part in the description which follows, and in part will become apparent to those skilled in the art upon examination of the following, or can be learned by practice of the invention.

BRIEF DESCRIPTION OF THE DRAWINGS

Aspects of the technology presented herein are described in detail below with reference to the attached drawing figures, wherein:

FIGS. 3A-E are schematics of exemplary implementations of virtually representing real-world spaces and objects in an augmented reality environment, in accordance with some aspects of the technology described herein;

DETAILED DESCRIPTION

Figure 1:
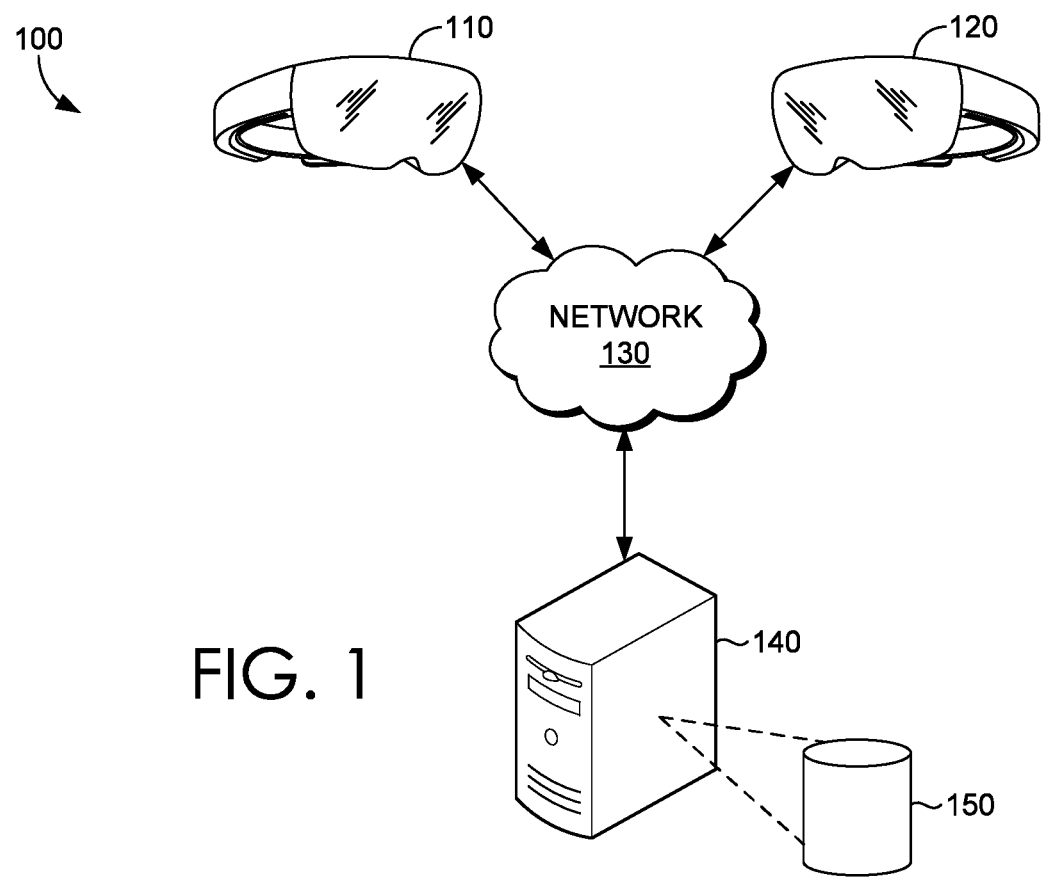
FIG. 1 is a diagram of an example operating environment in accordance with some aspects of the technology described herein.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

As used herein, the term "virtual object" (VO) can refer to any computer-generated object or any computer-generated visualization of a physical or a non-physical object. Such computer-generated objects (or computer-generated visualizations thereof) can be one-dimensional (1D) objects, two-dimensional (2D), or three-dimensional (3D) objects (or visualizations thereof). An "environment" can refer to any physical (e.g., "real-world") or non-physical (e.g., "computer-generated" or "virtual") environment, or any combination of such environments. Such environments include, but are not limited to, virtual-reality environments, augmented-reality environments, and/or mixed-reality environments. While the present disclosure primarily references AR as the embodied technology, other technologies such as mixed reality, holography, and virtual reality, are technologies that remain within the purview of the present disclosure.

According to some aspects of the technology described herein, wearable display devices, for example head-mounted display (HMD) devices or HMDs, can be equipped with one or more optical input devices (e.g. a camera) to enable accumulation of three-dimensional data (e.g. 3D maps, depth maps) representing the geometry of a user's environment and/or objects therein. The three-dimensional data can represent any number of environments (e.g. real-world spaces) at a particular location, including any number of objects therein. The environments and/or objects can then be presented to a user of a display device as one or more virtual representations of the real-world spaces and objects. Accordingly, such display devices can further present the virtual representations accurately with respect to their geometry and/or appearance. In circumstances where a real-world space or object is obstructed by another object (e.g., as a device generates the three-dimensional data), the space or object can be extrapolated according to the visible portions, in some embodiments. Moreover, the virtual representations can be normalized according to spatial illumination and relationships. The three-dimensional data can then be stored on a device or on a remote server, by way of example.

According to some aspects, the display devices can send and receive virtual objects or representations to and from other display devices (e.g. HMDs), respectively, to facilitate collaboration on visual data in AR environments. In other words, a HMD in accordance with some embodiments described herein can share virtual representations of real-world spaces and objects to HMDs of collaborating AR users. In some aspects, the sharing of real-world spaces and objects between HMD users located at different locations is contemplated as an advantage of the present disclosure. In some embodiments, the virtual representations can be displayed at full size (e.g., a 1:1 aspect ratio) or, in other embodiments, miniaturized to a consistent scale (e.g. a 20:1 aspect ratio) to fit into the real-world environment of a user. In this way, virtual representations of spaces and objects can be viewed via a HMD such that the virtual representations maintain true to their real-world counterparts, and to some degree, maintain a sense of realism by way of its rendered physical properties (e.g. size, geometry, appearance). In some aspects, a user can specify one or more virtual representations (e.g. real-world space and/or objects) to send, via a first HMD, to a second HMD of another user. A receiving HMD can receive the virtual representations at its respective location, such that the virtual representations can be viewed, via the receiving HMD, having similar or same properties of their real-world counterparts.

According to some embodiments, implementations of scanning, generating, rendering, viewing, sending, and receiving three-dimensional virtual spaces and objects (including both geometry and appearance) via a HMD is described. In some embodiments, a user operating a head-mounted display (HMD) device can scan an environment with the HMD device (e.g., via its camera), which in some embodiments, can further segment the scanned environment to generate one or more virtual objects that together represent a portion or entirety of the scanned environment. A user can then specify, via a first HMD, one or more virtual objects from the scanned environment to share with a second HMD (e.g., of another user). It will be appreciated that more than one object can be selected by the HMD from one or more environments to store or share with another HMD. As a user scans their environment, the HMD device can recognize the appearance and physical properties of both the physical environment and the physical objects therein. In some embodiments, objects or parts of objects that cannot be directly scanned (e.g., are at least partially obstructed) can be automatically completed by the HMD device according to the visible areas of the scanned environment and relationships between objects detected therein. Any one object's appearance can be normalized based on a scanned environment's detected illumination and its spatial relationships to other objects within the environment. An object from the scanned environment can be stored by a first HMD, recreated at a second location by the first HMD, or sent to a second HMD at a second location to be recreated by the second HMD. The receiving HMD, within a receiving environment (e.g., the physical environment of a second location) can then display the received object(s) at full-size or with reduced dimensions (e.g., miniaturized). Further the user at the second location can employ the second HMD to view the object at various locations within the receiving environment, and in some aspects, can be adaptively rendered to change its appearance based on a detected illumination of the receiving environment. In some instances, a HMD device can automatically position a received virtual object so that when rendered for display, will not intersect, overlap, or obstruct any physical object(s) physically present in the receiving environment. In this regard, in some embodiments virtual objects can be automatically positioned or aligned according to any detected physical properties of a receiving environment during a scan thereof by the receiving HMD.

Referring now to the figures, with reference to FIG. 1, FIG. 1 depicts a block diagram of an exemplary computing environment 100 in which some embodiments of the present disclosure can be employed. It should be understood that this and other arrangements described herein are set forth only as examples. Other arrangements and elements (e.g., machines, interfaces, functions, orders, and groupings of functions) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory.

Among other components not shown, example operating environment 100 includes at least two user devices, such as HMD devices 110 and 120; a network 130; at least one server 140; and at least one data source 150. It should be understood that environment 100 shown in FIG. 1 is an example of one suitable operating environment. Each of the components shown in FIG. 1 can be implemented via any type of computing device, such as computing device 700 described in connection to FIG. 7, for example. These components can communicate with each other via network 130, which can include, without limitation, one or more local area networks (LANs) and/or wide area networks (WANs). In exemplary implementations, network 130 comprises the Internet and/or a cellular network, amongst any of a variety of possible public and/or private networks.

It should be understood that any number of user devices, servers, and data sources can be employed within operating environment 100 within the scope of the present disclosure. Each can comprise a single device or multiple devices cooperating in a distributed environment. For instance, server 140 can be provided via multiple devices arranged in a distributed environment that collectively provide the functionality described herein. Additionally, other components not shown can also be included within the distributed environment.

User devices 110 and 120 can be client devices on the client-side of operating environment 100, while server 140 can be on the server-side of operating environment 100.

Server 140 can comprise server-side software designed to work in conjunction with client-side software on user devices 110 and 120 so as to implement any combination of the features and functionalities discussed in the present disclosure. This division of operating environment 100 is provided to illustrate one example of a suitable environment, and there is no requirement for each implementation that any combination of server 140 and user devices 110 and 120 remain as separate entities.

User devices 110 and 120 can comprise any type of computing device capable of use by a user. For example, in one embodiment, user devices 110 and 120 can be the type of computing device described in relation to FIG. 7 herein. By way of example and not limitation, a user device can be embodied at least in part as a personal computer (PC), a laptop computer, a head-mounted display, a cellular or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device that can be coupled to a head-mounted display, projector, eyewear, wearable, or other augmented reality or HMD. One non-limiting example of a HMD is the Microsoft® HoloLens® by Microsoft, Inc., though many other implementations of HMDs or augmented reality viewing devices are considered within the purview of the present disclosure.

Data storage 150 can comprise data sources and/or data systems, which are configured to make data available to any of the various constituents of operating environment 100, or systems 200, 300, 400 described in connection to FIGS. 2, 3, and 4. For example, in one embodiment, one or more data sources 150 can provide (or make available for access) three-dimensional datasets for storage in computing component 230 of FIG. 2. Data source 150 can be discrete from user devices 110 and 120 and server 140 or can be incorporated and/or integrated into at least one of such components. In some embodiments, each user device 110, 120 can retrieve one or more datasets from the data source 150, such that each user device 110, 120 can independently store and employ the dataset(s). In some embodiments, data source 150 can comprise a single dataset or a collection of datasets, which can be shared amongst multiple user devices, such as user devices 110 and 120. In various embodiments, the data source 150 stores a shared collection of datasets that can be interpreted, analyzed, and/or processed by the user devices 110, 120, such that an augmented reality environment, based on the shared collection of datasets, is generated and/or rendered by each user device. In further embodiments, the shared collection of datasets includes visual data that can be interpreted, analyzed, processed, rendered, and/or provided for display by a HMD, such as user devices 110, 120, and/or displayed by the HMD.

Figure 2:
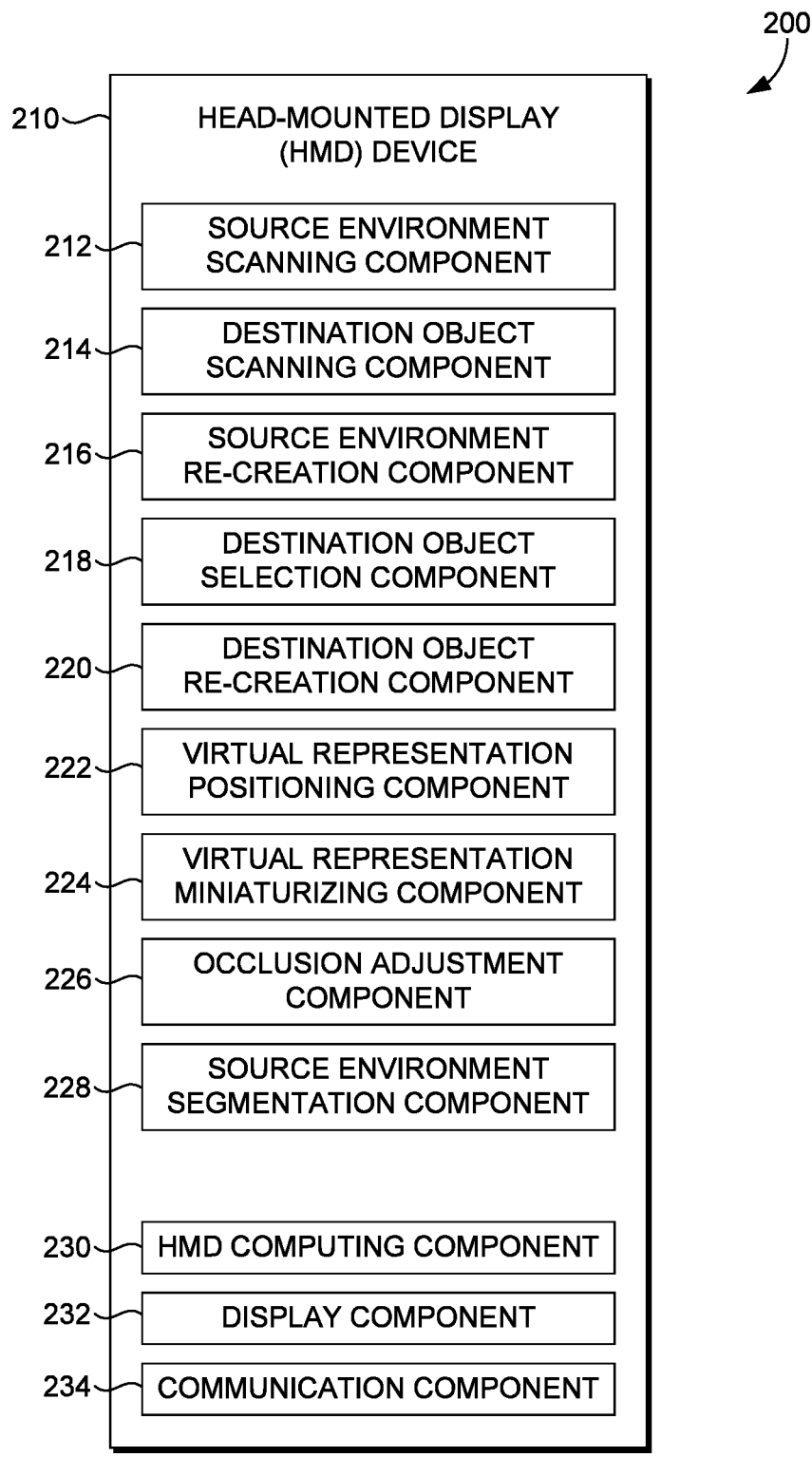
FIG. 2 is a block diagram depicting an exemplary component of computing architecture, in accordance with some aspects of the technology described herein.
Figure 3C:
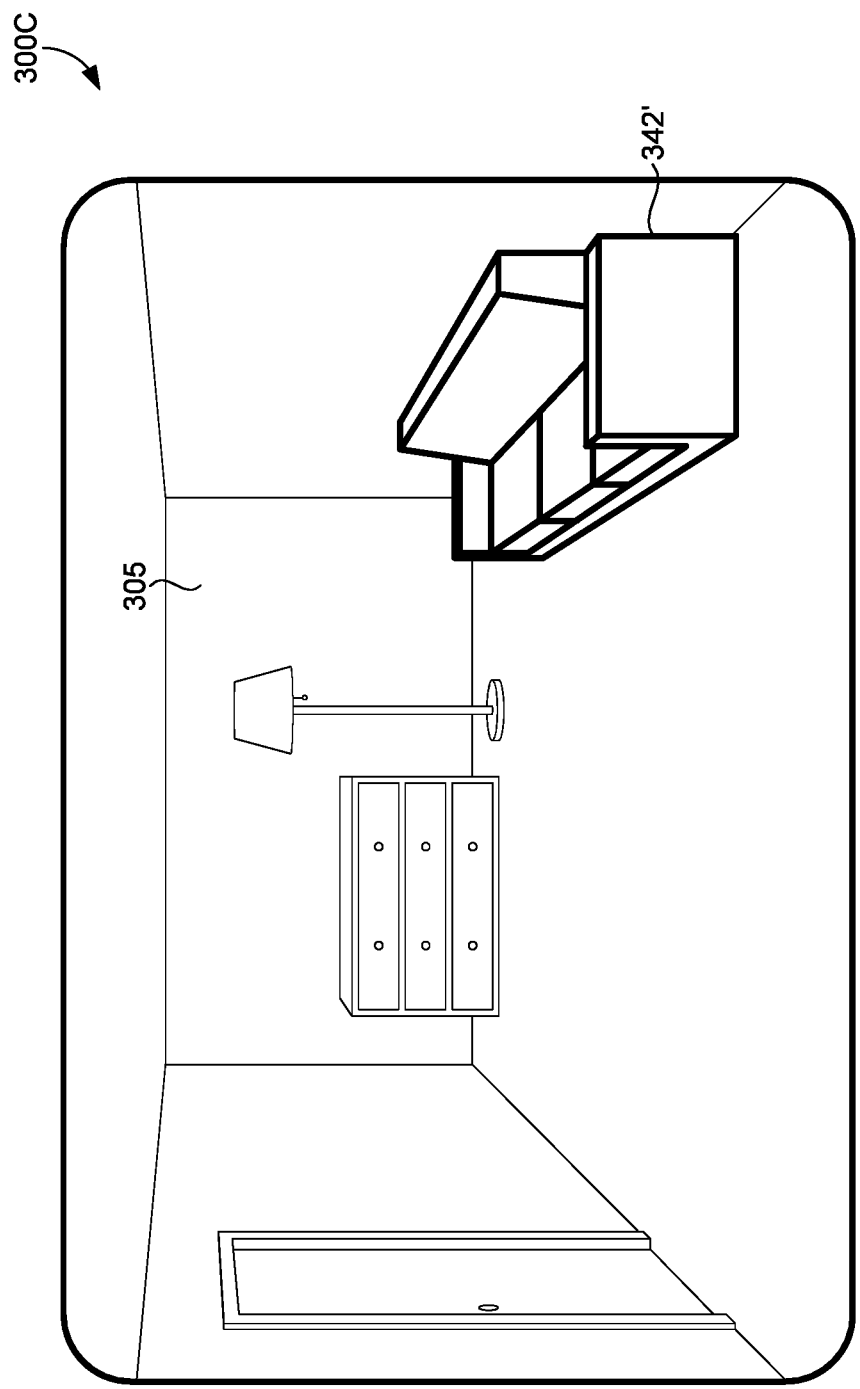

Operating environment 100 can be utilized to implement one or more of the components of system 200, described in FIG. 2, including components for rendering, providing for display, and/or displaying 3D views, processing computer-executable instructions, storing computer-executable instructions and visual data, communicating with server 140 and/or other HMD's, requesting and receiving collaborative views from other HMDs, and/or processing requests for collaborative views from other HMDs, among other things.

In some embodiments, the functions performed by components of system 200 can be associated with one or more HMD applications, services, or routines. In particular, such applications, services, or routines can operate on one or more user devices (such as user device 102), servers (such as server 140), and/or components thereof, and/or can be distributed across one or more user devices and servers, or be implemented in the cloud. Moreover, in some embodiments, the components of system 200 can be distributed across a network, including one or more servers (such as server 140) and client devices (such as user device 110, 120), in the cloud, or can reside on a user device, such as user device 110, 120. Moreover, these components, functions performed by these components, or services carried out by these components can be implemented at appropriate abstraction layer(s), such as the operating system layer, application layer, hardware layer, of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, the HMD device 210 is an augmented reality or mixed-reality computing device that is generally responsible for presenting virtual representations of real-world spaces and objects and the sharing of such virtual representations, for example as one or more shared datasets. The HMD 210 can be coupled to one or more optical input devices (not shown) which can be integrated into the HMD 210. In some embodiments, the one or more optical input devices are logically coupled to the HMD device 210 or alternatively in operable communication with the HMD device 210. The optical input device can receive optical information, which can be collected or aggregated as one or more three-dimensional datasets. The HMD device 210 can include one or more computing components 230, display components 232, and communication components 234. Each dataset (e.g. three-dimensional dataset) acquired by the HMD device 210, for example via an optical input device, can be stored in storage 150 of FIG. 1. It will be appreciated that datasets can also be stored locally on a memory or cache included in the HMD, such as a storage and/or memory included in computing component 230, for example in a storage component. As noted herein, the HMD 210 and its components can be implemented as any type of computing device, such as computing device 700 described in connection to FIG. 7, for example.

In some embodiments, the HMD 210 includes at least one processor included in computing component 230. The processor can include any type of computing processor, including a graphics processor. The processor can be employed by the HMD to perform any of the functions or operations described herein, and can further render for display, holographic data obtained by the HMD 210. The HMD 210 can employ a display component, such as display component 232, that can display and/or project computer-generated objects to be perceived as an augmented object positioned within the real-world, by a user of the HMD. In accordance with embodiments described herein, the display component 220 can comprise a see-through display (e.g., a waveguide), a virtual retinal display, prisms, or any other photonic technologies operable to facilitate a mixed-reality experience for a user.

In some embodiments, the HMD 210 includes a communication component 234 that can facilitate communication with a remote server device, such as server 140 of FIG. 1, to obtain at least a portion of a dataset therefrom. In other embodiments, the communication component 234 of the HMD 210 can also facilitate communication directly with another HMD device. The communication component 230 can both send and receive three-dimensional datasets (e.g. sets of holographic data) to/from one another directly, via other HMDs, and/or via one or more remote servers.

According to some aspects of the present technology, the HMD device 210 includes one or more scanning components, such as 212, 214 of FIG. 2. The HMD device 210 includes a source environment scanning component 212 which can generate one or more collections of three-dimensional datasets corresponding to one or more physical environments at one or more locations. The datasets can be generated based on optical information obtained via an optical input device in operable communication with the HMD device 210. The generated three-dimensional datasets can further include detected physical properties associated with the physical environments, such as relationships between physical objects in the environment, color of physical objects within the physical environment, and/or texture of the physical objects. The one or more datasets (e.g. three-dimensional datasets) generated by the source environment scanning component can be stored locally or remotely, such as in local memory of the HMD computing component 230 or in data storage 150 of FIG. 1. It will be appreciated that any of the datasets (e.g. three-dimensional datasets) generated by any of the components of the HMD device 210 may be stored locally or remotely.

The HMD device 210 can include a source environment re-creation component 216, to render for display a virtual representation of a physical environment based on one or more generated collections of three-dimensional datasets, such as the three-dimensional datasets generated by the source environment scanning component 212. In some aspects, the virtual representation of the physical environment maintains the various physical properties detected by the source environment scanning component 212, which can include any number of physical properties, such as dimensional properties, relative properties (e.g., relative positions), color, and/or texture. The source environment re-creation component 216 is generally responsible for creating a virtual representation of a scanned physical environment at a first location for display at a second location that is different than the first location. In some instances, the virtual representation can be rendered at a 1:1 aspect ratio.

Once a virtual representation of an environment is generated, a segmentation component 228 can automatically segment the virtual environment into one or more virtual objects. The segmented virtual objects can in some instances correspond to the physical (real-world) objects in the source environment. In some aspects the HMD device 210 can present for display one or more segmentation options for selection by a user via one or more input commands. The segmentation of a virtual environment into individual virtual objects can then facilitates the transfer and manipulation of those objects in the virtual environments.

The HMD device 210 can further include a destination object scanning component 214. The destination object scanning component 214 can be configured to generate a collection of three-dimensional datasets that corresponds to a physical object (e.g., a real-world object) within a physical environment. The three-dimensional datasets can be generated based on optical information obtained via an optical input device coupled to the HMD device 210. The generated three-dimensional datasets can include detected physical properties associated with the physical object, such as dimension, color, texture, and the like. The destination object scanning component can operate in conjunction with a destination object selection component 218, which can enable the selection of a physical object within a physical environment to be viewed on the display of the HMD device 210, based on a received input. The physical object can be selected and then rendered for display by the HMD device 210 to be perceived as being located within a virtual representation of an environment, for example, the virtual representation of a physical environment rendered for display by the source environment re-creation component 216.

The HMD device 210 can further include an object re-creation component, for example a destination object re-creation component 220 or a physical object re-creation component. The object re-creation component can render for display on the HMD device 210 a virtual representation of a physical object based on a generated collection of three-dimensional datasets, for example, datasets acquired by the destination object scanning component 214. The virtual representation of the physical object can be rendered to maintain any number of physical properties associated with the physical object, in accordance with some embodiments described herein. The destination object re-creation component can retrieve any portion of any of the generated collections of three-dimensional datasets to render for display. For example, a second generated collection of three-dimensional datasets may be stored that corresponds to the physical object scanned by the destination object scanning component 214. The destination object re-creation component can retrieve the stored collection of three-dimensional datasets and render for display, at the first location and via the HMD, the second virtual representation of the selected physical object.

In various aspects of the technology described herein, the HMD device 210 can further include any number of virtual representation components, for example, a virtual representation positioning component 222, a virtual representation miniaturization component 224, and an occlusion adjustment component 226. In an embodiment, a virtual representation positioning component 222 can determine a position to render a virtual object either within a physical environment or a virtual representation of that physical environment.

In some embodiments, a virtual representation miniaturization component 224 can be implemented to render a virtual environment or virtual object with reduced dimensions, to facilitate a top down view of the virtual environment, by way of a non-limiting example. In this way a user can select one or more virtual objects to place within a miniature virtual environment at the same reduced scale as the selected virtual object(s) to view the virtual object(s) within the virtual environment at a high level, and in some further embodiments, manipulate (e.g., move, reposition, rotate, remote, swap) the virtual objects within the virtual environment.

In some further embodiments, the HMD device 210 can also include an occlusion adjustment component 226 configured to modify a displayed virtual representation (e.g. a virtual environment or virtual object). The occlusion adjustment component 226 can modify or change the illumination (e.g. ambient occlusion) of a virtual object or environment or modify a visible portion of a virtual object. For example, the illumination of a virtual object generated at a second location can be modified to match the illumination (e.g., lighting characteristics) of a virtual environment generated at a first location. Further, portions of a virtual object can be modified as it is manipulated within a virtual environment. For example, a virtual representation of a chair can be made to look as if it were at least partially underneath a virtual representation of a table.

Turning now to FIGS. 3A-3E, schematics of exemplary implementations of virtually representing real-world spaces and objects in an augmented reality environment are provided. At 300A of FIG. 3A, a user 310 at a first location scans the surrounding physical environment (e.g., source environment) to acquire and/or generate one or more collections of three-dimensional datasets, where the datasets correspond to at least a portion of a physical environment at the first location. A physical environment can include either real-world spaces 305 (e.g. a room itself), objects therein (330, 330n), or both. As a user scans and generates the three-dimensional datasets, the HMD 320 can detect (and include or associate with those datasets) physical properties associated with the physical environment being scanned, in accordance with some embodiments described herein. The generated three-dimensional datasets can be stored on the HMD device 320 (e.g. the HMD computing component 230 of FIG. 2) or communicated to a remote storage location (e.g. 150 of FIG. 1) for storage thereon. The HMD device can retrieve any portion of a generated three-dimensional dataset from either local or remote storage.

Looking now at FIG. 3B, a user 310 is shown in a second physical environment 300B. The second physical environment can include one or more physical objects 340, 342. Utilizing the HMD device 320, the user 310 can re-create and render for display the source environment as a virtual environment 305'. The virtual environment 305' can be displayed so as to maintain any of the physical properties of the physical environment of the first location (e.g. the source environment) which can be detected by the HMD device 320. The physical properties can include, for example, any relational or aspect properties, or illumination properties such as color or shading. While located in the second physical environment 300B, a user 310 can view or otherwise incorporate one or more physical objects 340, 342 within the virtual environment 305'.

In some aspects, a user 310 can select which physical object 340, 342 to be viewed in the virtual environment 305'. For example, the HMD device 320 can include a physical object selection component so that based on some received input by the HMD device 320 the selected physical object 340, 342 can be perceived in the virtual environment 305'. In some aspects the user 310 can select one or more physical objects 340, 342 to be included in the augmented reality (AR) environment. In some aspects, a user 310 can hide one or more physical objects 340, 342 such that they are not perceived in the virtual environment 305'. In this way, while located in the second physical environment 300B, a user 310 can view or otherwise incorporate only those physical objects 340, 342 they wish to see and obstruct or otherwise hide any object they do not wish to view. In some instances an HMD 320 may view or hide one or more physical objects based on a user's 310 input, for example via the occlusion adjustment component 226 of FIG. 2.

Looking back at FIG. 3B. a user 310 is looking at physical object 342 in the physical environment of the second location 300B, and viewing the physical object 342 in the virtual environment 305'. The virtual environment 305' and the physical object 342 are viewed through the HMD device 320 as an augmented reality environment 306. According to some aspects of the present technology, the HMD device 320 includes a positioning component (e.g. virtual representation positioning component 222 of FIG. 2) which is configured to position the viewed physical object 342 correctly within the virtual environment 305', such that the physical object 342 does not intersect any boundaries of the virtual environment 305' or any of the virtual objects 330' therein. Alternatively, in some embodiments, the virtual environment 305' can adapt to accommodate a physical object 342 that has dimensions exceeding the virtual environment 305' spatial dimensions. For example, if a physical object 342 is very large, a hole (e.g. a cutout) can be created in one of the walls of the virtual environment 305' to allow the full physical object 342 to be viewed in the augmented reality environment 306. In this way the virtual environment 305' can be modified to accommodate the physical object 342 without having to distort or otherwise resize the virtual environment 305'. In some aspects, the physical object 342 can be viewed under the illumination of the virtual environment 305' via an occlusion adjustment component (e.g. 226 of FIG. 2). Further, according to some embodiments of the technology, a user 310 can actually interact with (e.g. sit on) the physical object 342 being viewed. In this way, the user 310 can interact with the physical object 342 as it is perceived at the first location (e.g. source environment).

As a user 310 is viewing the physical object 342 at the second location 300B, the HMD device 320 can scan the physical object 342 via an object scanning component (e.g. a destination object scanning component 214 of FIG. 2) to generate a collection of three-dimensional datasets corresponding to the physical object. The three-dimensional datasets can be generated, for example, based on optical information obtained by an optical input device coupled to the HMD device 320. The generated three-dimensional datasets corresponding to the physical object can include detected physical properties, such as geometric properties or illumination properties (e.g. color and/or shading). Looking now at FIG. 3C an augmented reality view 300C is depicted where a user of a HMD device perceives the physical environment of the first location 305 with the virtual object 342' which was scanned at the second location, the virtual object 342' maintaining the physical properties of the original physical object. In some aspects, the HMD device can automatically position (e.g. via a virtual representation positioning component 222 of FIG. 2) the virtual object 342' within the AR environment such that the virtual object 342' does not intersect the boundaries of the physical environment or any of the physical objects therein. Further, the virtual object 342' can be viewed under the illumination of the physical environment 305, for example via the occlusion adjustment component 226 of FIG. 2. In some aspects, a user can manipulate the virtual object 342' thereby moving it within the AR environment viewed through the HMD device. It will be appreciated that a user can scan any number of physical objects at various locations, generating and storing one or more three-dimensional datasets for each physical object, and then re-create and render for display one or more virtual representations of those objects in the same physical environment.

Figure 3D:
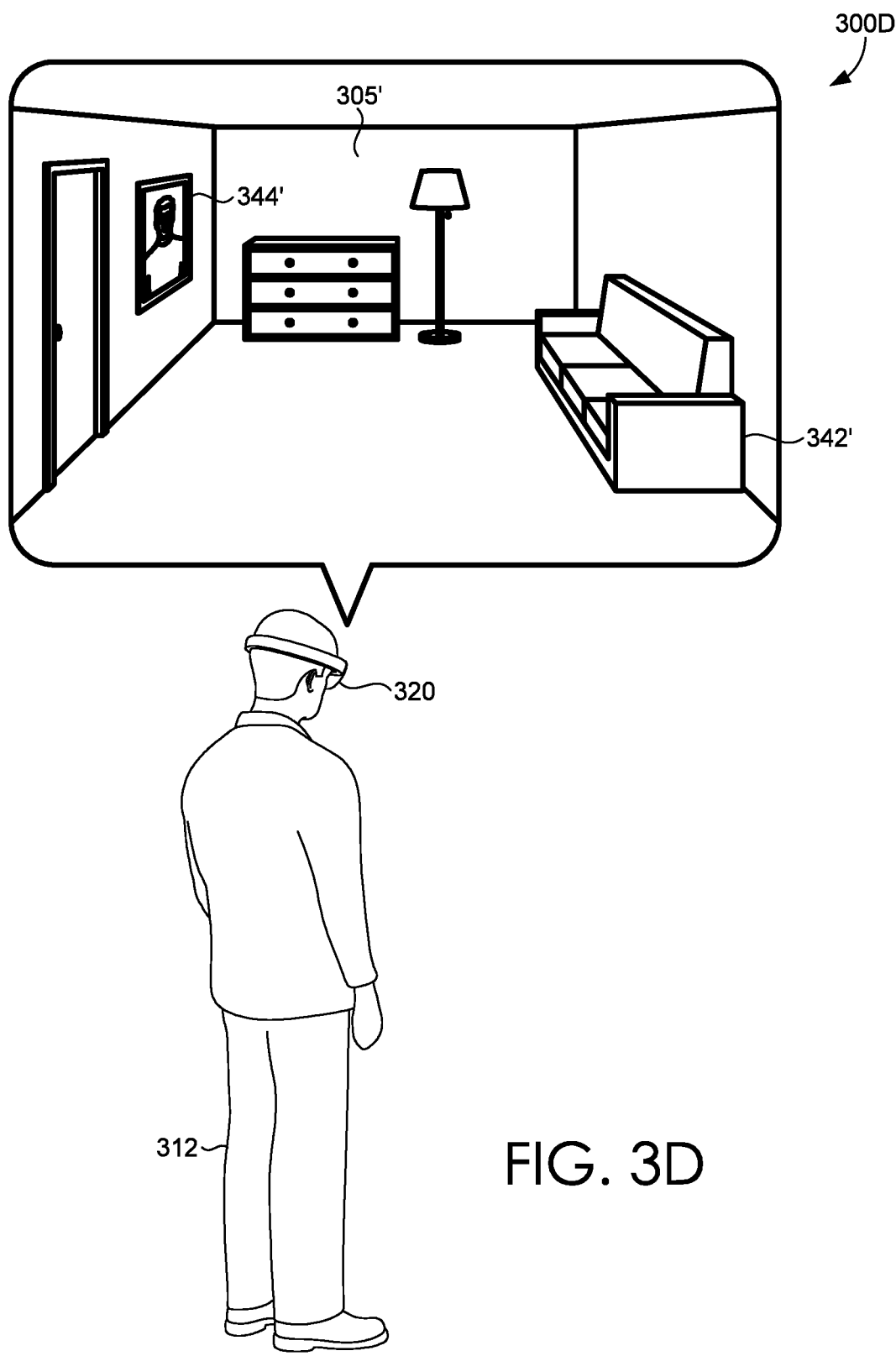

Referring now to FIG. 3D, a user 312 is depicted viewing an augmented reality environment at a third location 300D via a HMD device 320. Based on datasets generated and stored by the HMD device 320, a user 312 can select an environment previously scanned to be re-created (e.g. via a source environment re-creation component 216 of FIG. 2) and rendered for display as virtual environment 305'. Further, a user 312 can select one or more of any previously scanned physical objects to be re-created (e.g. via destination object re-creation component 220 of FIG. 2) and rendered for display as virtual objects 342', 344' simultaneously with virtual environment 305'. Utilizing one or more commands which are received by HMD device 320, a user 312 can manipulate the virtual objects 342', 344' within the virtual environment 305'. It will be appreciated that the virtual objects 342', 344' can be viewed under the illumination of the virtual environment 305'. According to some aspects, user 312 is a second user where the HMD device 320 receives the one or more datasets from a first HMD device or a remote server (e.g. 140 of FIG. 1). In this way, a first user scanning one or more physical objects and generating three-dimensional datasets based on those physical objects, can send the three-dimensional datasets to a second HMD device, and the second HMD device can re-create and render them for display virtual objects corresponding the physical objects scanned by the first HMD device. In some embodiments the first user and the second user can collaborate in the AR environment and simultaneously view the virtual environment 305' and manipulate the virtual objects 342', 344' therein.

Figure 3E:
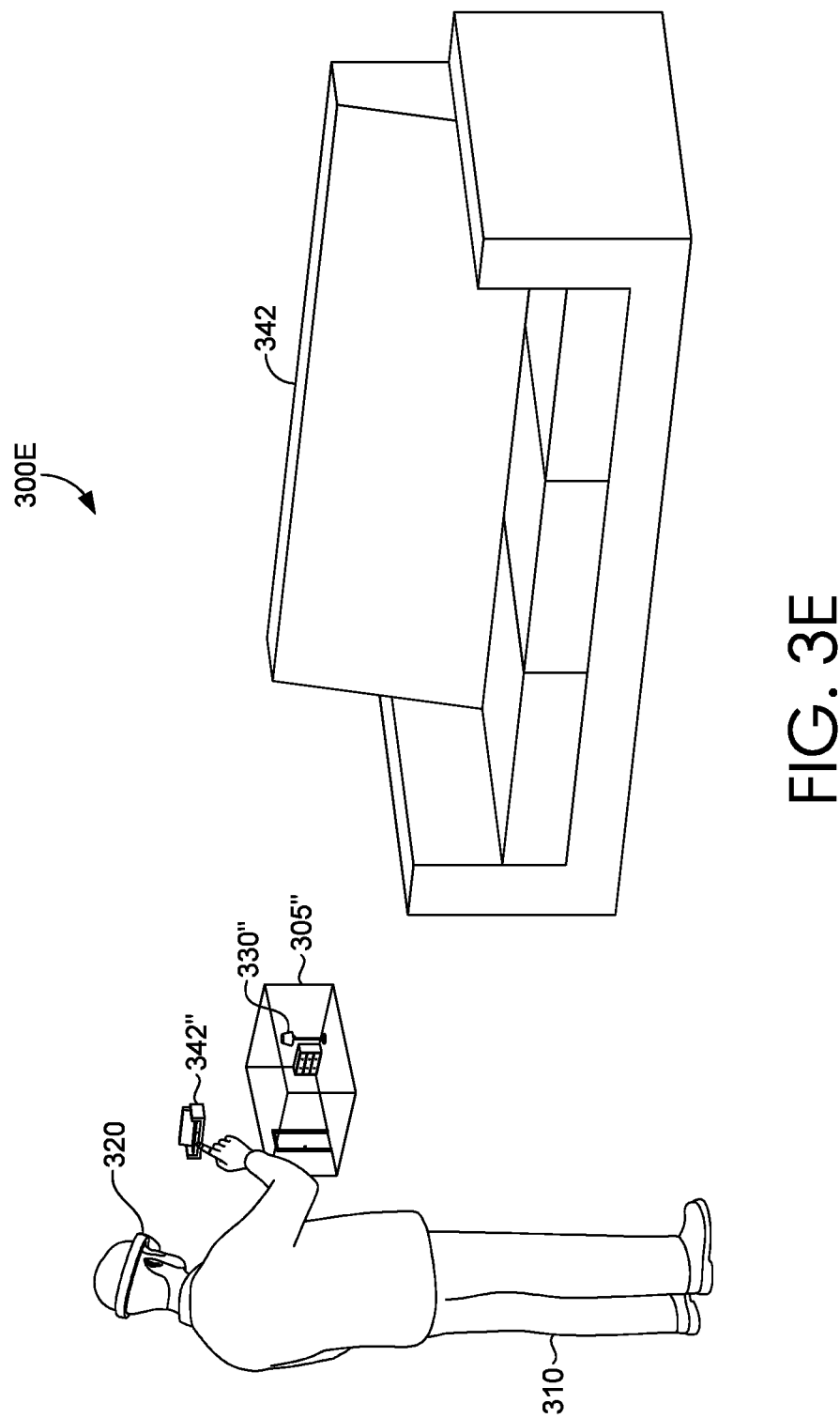

Turning now to FIG. 3E, virtual representations can be viewed with reduced dimensions within an environment 300E. In the illustrated schematic, a user 310 can view a virtual environment 305' with reduced dimensions as a reduced virtual environment 305". In some aspects, the reduced virtual environment 305" can be viewed simultaneously with the virtual environment 305' or simultaneously with a physical environment, such as physical environment 305. A user 310 can also view any number of virtual objects (i.e. virtual representations of a physical object 342) with reduced dimensions as a reduced virtual object 342". As such, in any physical environment a HMD device 320 can scan any number of physical objects (e.g. physical object 342) and re-create them as virtual objects with reduced dimensions (e.g. reduced virtual object 342") and a user can then view those reduced virtual objects in a reduced virtual environment (e.g. 305"). Based on received input, the HMD 320 can re-create any number of virtual environments previously scanned with reduced dimensions. A user can then manipulate any of the reduced virtual objects 342" within the reduced virtual environment 305". Further, because the HMD can segment virtual objects contained within a virtual environment (e.g. 330"), a user can manipulate those as well.

Figure 4:
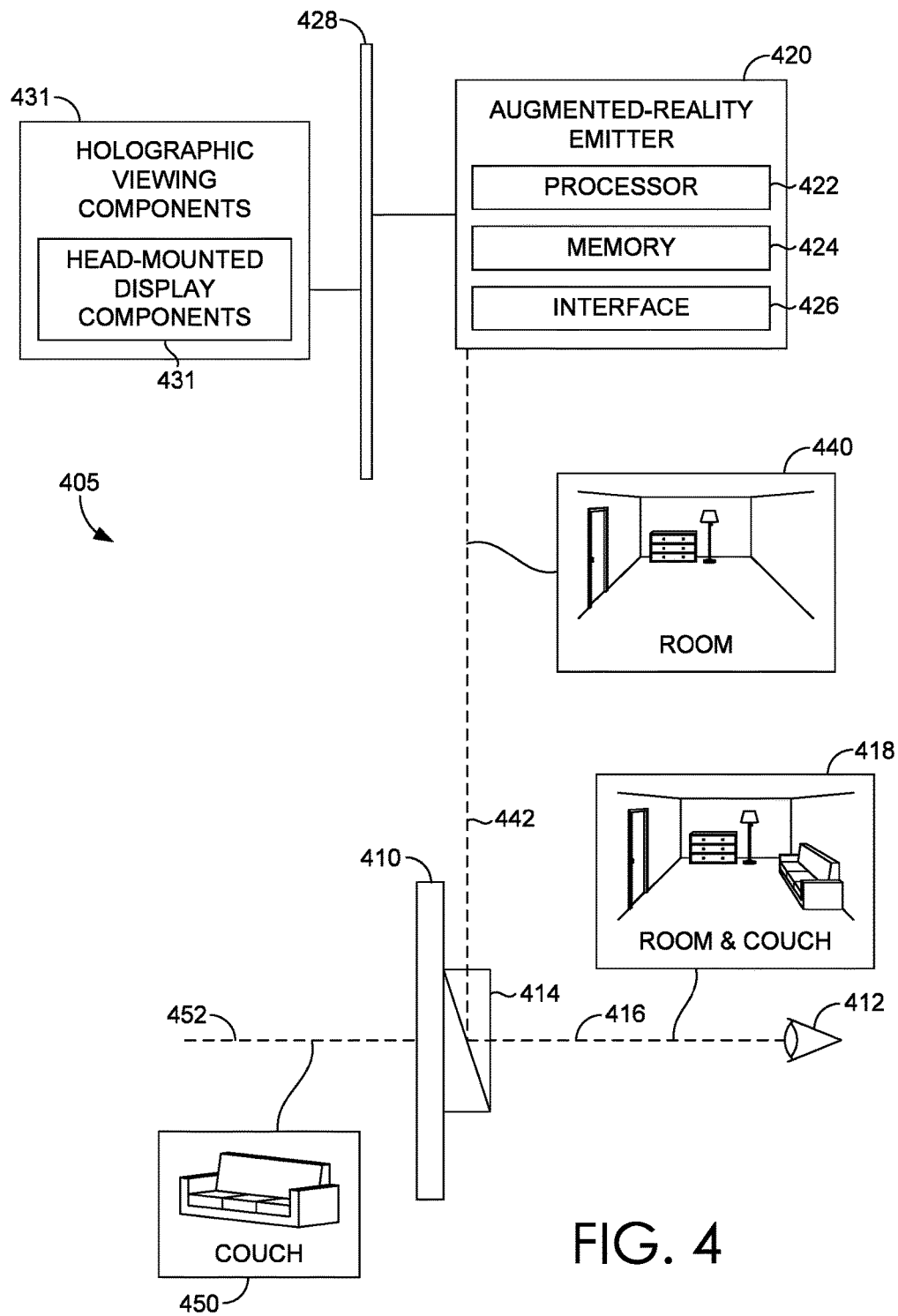
FIG. 4 is a block diagram of an exemplary HMD, in accordance with some aspects of the technology described herein.

Turning to FIG. 4, a HMD device 405 having a plurality of components 430 (such as those described with reference to FIG. 2) is described according to aspects of the technology described herein. The HMD device 405 includes, among other things, a see-through lens 410 which can be placed in front of a first user's eye 412, similar to an eyeglass lens. It is contemplated that a pair of see-through lenses 410 can be provided, one for each eye 412. The lens 410 includes an optical display component 414, such as a beam splitter (e.g., a half-silvered mirror). The HMD device 405 includes an augmented-reality emitter 420 that facilitates altering the brightness of computer-generated AR images. Amongst other components not shown, the HMD device 405 also includes a processor 422, memory 424, interface 426, a bus 428, and additional holographic viewing components 431. The augmented-reality emitter 420 emits light representing one or more augmented-reality images 440 exemplified by a light ray 442. Light from a real-world scene 450, such as light ray 452, reaches the lens 410. Additional optics can be used to refocus the augmented-reality images 440 so that they appear to originate at a distance from the eye 412 rather than inches away, where the display component 414 actually is. The memory 424 can contain instructions which are executed by the processor 422 to enable the augmented-reality emitter 420 to perform any of the functions described herein. One or more of the processors 422 can in some instances be considered control circuits. The augmented-reality emitter 420 communicates with the additional holographic viewing components 431 using the bus 428 and/or other suitable communication paths.

Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

Any one or more augmented-reality images 440 (e.g. virtual images) are reflected by the display component 414 toward a first user's eye, as exemplified by a light ray 416, so that the first user sees an image 418. In the image 418, a portion of the real-world scene 450 is visible along with any number of augmented-reality images 440.

Figure 5:
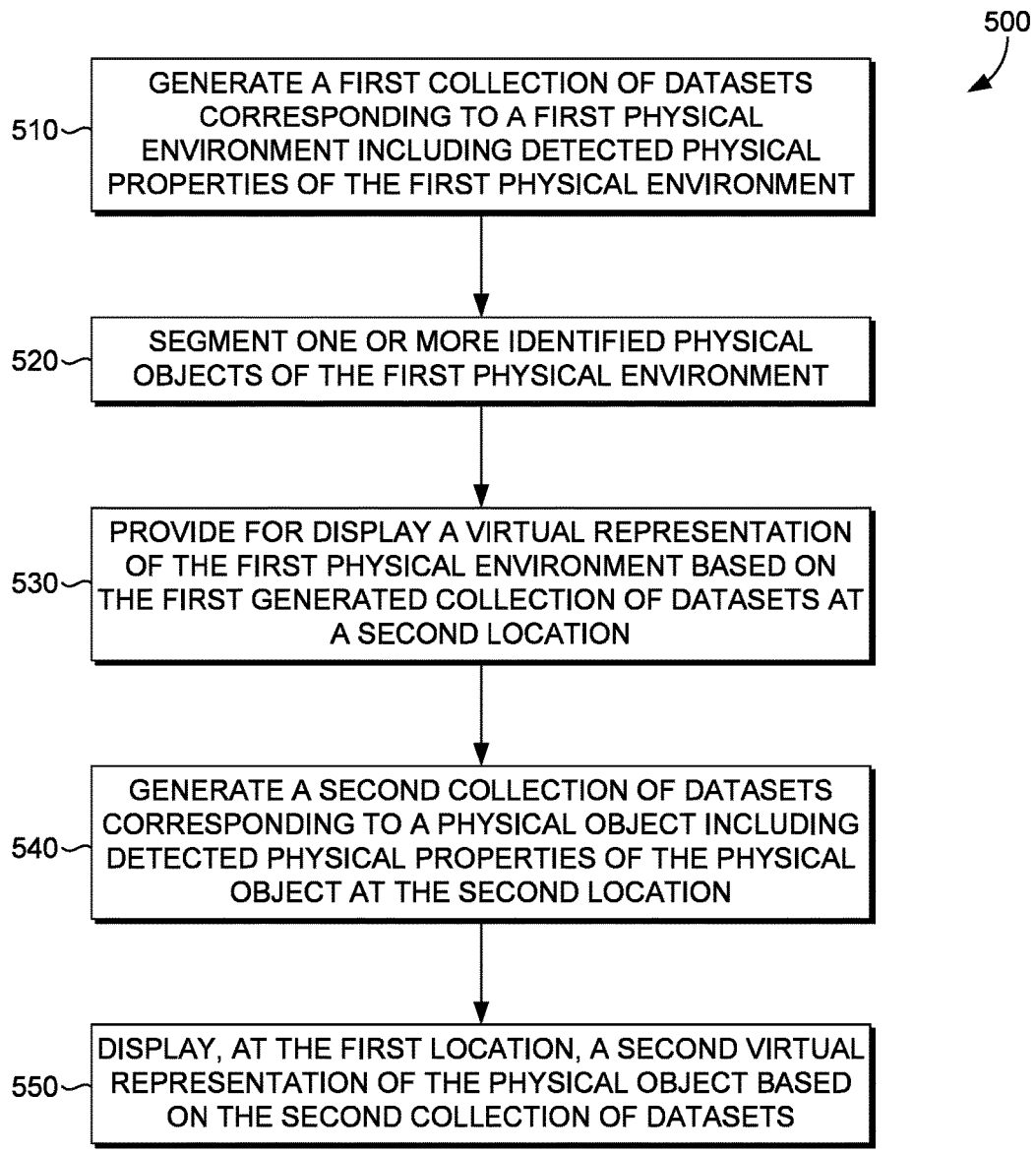
FIG. 5 is a flow diagram showing a method for presenting virtual representations of real-world spaces and objects in various environments, in accordance with some aspects of the technology described herein.

Turning now to FIG. 5, a flow diagram is provided illustrating one example method 500 for presenting virtual representations of real-world spaces and objects in various environments. It is contemplated that each block or step of method 500 and other methods described herein comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a stand-alone application, a service or hosted service (stand-alone or in combination with another hosted service), or a plug-in to another product, to name a few.

At step 510, a HMD device at a first location can generate a first collection of three dimensional datasets based on optical input data obtained by an optical input device that is in operable communication with the HMD device. The HMD device can obtain the optical input data through, for example, dynamic scanning. The first collection of three-dimensional datasets corresponds to a first physical environment at the first location and can include detected physical properties associated with the first physical environment. The detected physical properties can include, for example, color and shading, dimensional properties, geometric relationships, or any other spatial or optical and/or chromatic properties.

At step 520, the HMD device can segment one or more identified physical objects of the first physical environment from the generated first collection of three-dimensional datasets. The segmenting can be based on any number of known techniques, including determined correlations to known objects from a dataset of known objects, determined indications of strong geometry and/or features, and a completion of smooth geometry to the generated first collections of three-dimensional datasets.

At step 530, the HMD device at a second location can provide for display a virtual representation of the first physical environment based on the first generated collection of three-dimensional datasets. The virtual representation can be displayed to maintain any of the detected physical properties associated with the first physical environment. In this way, while at a second location, a user can view, via the HMD device, a virtual representation of the environment at the first location. In some embodiments, the virtual representation has the same dimensional and spatial properties as the first physical environment (i.e. source environment). In some further embodiments, the virtual representation has the same illumination properties as the first physical environment.

At step 540, the HMD device at the second location can generate a second collection of three dimensional datasets based on optical input data obtained by an optical input device that is in operable communication with the HMD device. The HMD device can obtain the optical input data through, for example, dynamic scanning. The second collection of three-dimensional datasets can correspond to one or more physical objects located in a second physical environment at the second location. The second collection of three-dimensional datasets can include detected physical properties associated with the physical object. The detected physical properties can include, for example, color and shading, dimensional properties, geometric relationships, or any other spatial or optical properties. Accordingly, as the first virtual representation is being displayed (e.g. at step 530), the HMD device enables a user to view one or more physical objects within the displayed virtual environment. While the physical object is being viewed within the displayed virtual environment, the HMD can scan the physical object and generate the above-described second collection of three-dimensional datasets. It will be appreciated that the HMD device can scan any number of physical objects at multiple locations, thus generating multiple collections of three-dimensional datasets, each corresponding to a physical object.

At step 550, the HMD device can provide for display, at the first location, a second virtual representation of the physical object based on the second generated collection of three-dimensional datasets. The second virtual representation (e.g. virtual object) can be displayed to maintain any number of detected physical properties associated with the physical object, for example any geometric or dimensional properties. In some embodiments, the illumination of the second virtual representation can be altered, for example by the HMD device, to match that of the first location. In this way, the second virtual representation can be viewed under the illumination properties of the first location. In some embodiments, any number of virtual objects can be displayed at the first location, and further manipulated within the augmented reality environment.

Figure 6:
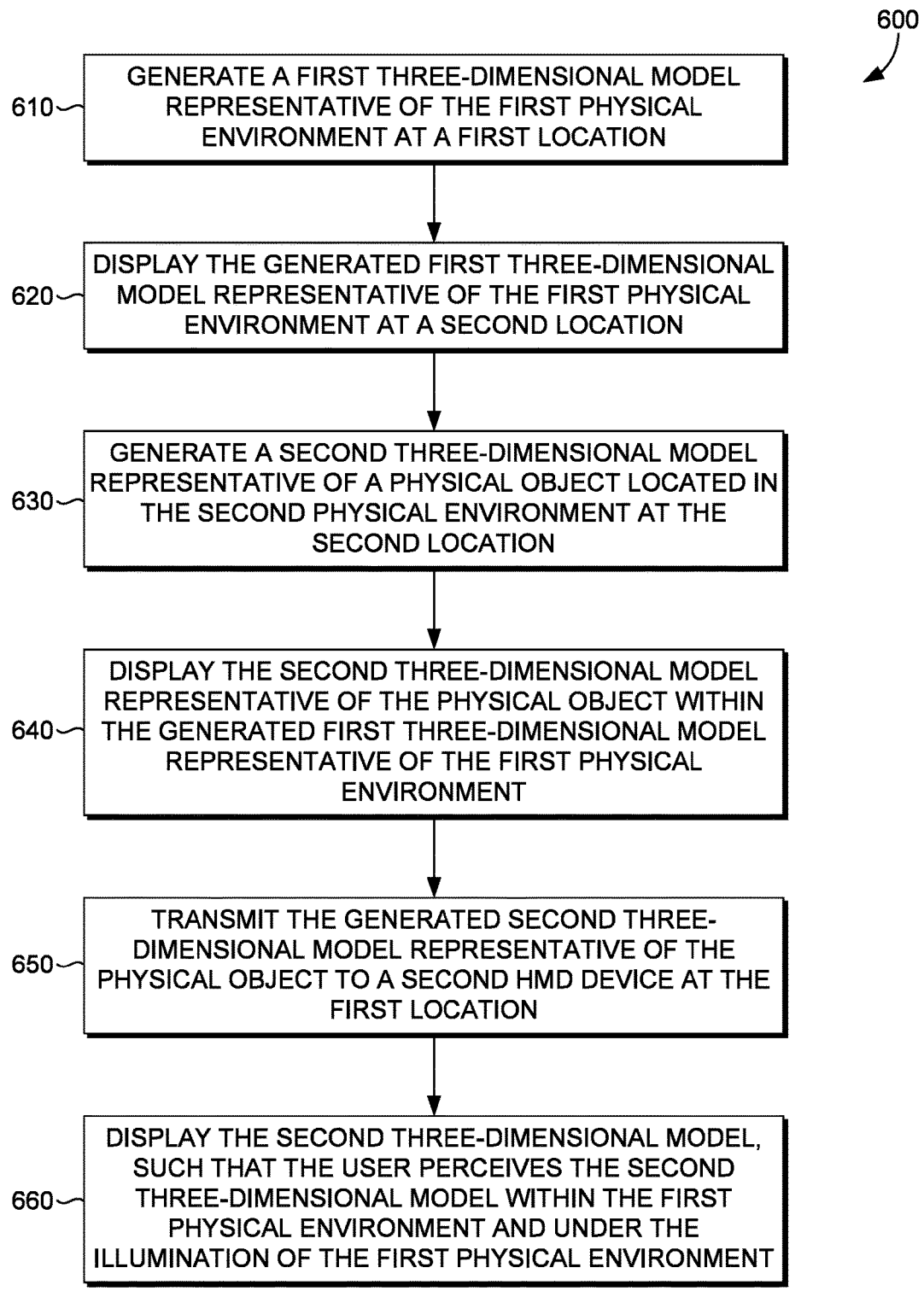
FIG. 6 is a flow diagram showing a method for presenting virtual representations of real-world spaces and objects in various environments, in accordance with some aspects of the technology described herein

Turning now to FIG. 6, a flow diagram is provided illustrating one example method 600 for presenting virtual representations of real-world spaces and objects in various environments. At step 610, a HMD device at a first location can generate a first three-dimensional model representative of the first physical environment based on optical input data obtained by an optical input device that is in operable communication with the HMD device. The HMD device can obtain the optical input data through, for example, dynamic scanning. The first three-dimensional model can include detected physical properties associated with the first physical environment. The detected physical properties can include, for example, color and shading, dimensional properties, geometric relationships, or any other spatial or optical and/or chromatic properties.

At step 620, the HMD device at a second location can provide for display the generated first three-dimensional model representative of the first physical environment. The first three-dimensional model can be displayed to maintain any of the detected physical properties associated with the first physical environment. Further, the generated first three-dimensional model can be displayed such that a user perceives the model within a second physical environment at the second location. In some further embodiments, the generated first three-dimensional model is displayed as having the same illumination properties as the first physical environment at the first location.

Based on the generated first three-dimensional model being displayed within the second physical environment, at step 630, the HMD device can generate a second three-dimensional model representative of a physical object located in the second physical environment based on optical input data obtained and/or received by the optical input device. In some embodiments, the generated second three-dimensional model maintains any number of physical properties associated with the physical object located in the second physical environment.

At step 640, the HMD device can provide for display the second three-dimensional model representative of the physical object such that the user perceives the second three-dimensional model within the first physical environment when at the first location. In some embodiments, the HMD device can provide for display the second three-dimensional model representative of the physical object such that the user perceives the second three-dimensional model within the generated first three-dimensional model representative of the first physical environment, for example, when at the second location or a third location.

At step 650, the HMD device can transmit to a second HMD device (either directly or via a remote server device) at the first location, the generated second three-dimensional model representative of the physical object. At step 660, the second HMD device can provide for display the second three-dimensional model, such that the user perceives the second three-dimensional model within the first physical environment and under the illumination of the first physical environment.

Accordingly, various aspects of technology for facilitating intuitive collaboration on visual data in an augmented reality environment is described. It is understood that various features, sub-combinations, and modifications of the embodiments described herein are of utility and can be employed in other embodiments without reference to other features or sub-combinations. Moreover, the order and sequences of steps shown in the example methods 500 and 600 are not meant to limit the scope of the present invention in any way, and in fact, the steps can occur in a variety of different sequences within embodiments hereof. Such variations and combinations thereof are also contemplated to be within the scope of embodiments of the invention.

Figure 7:
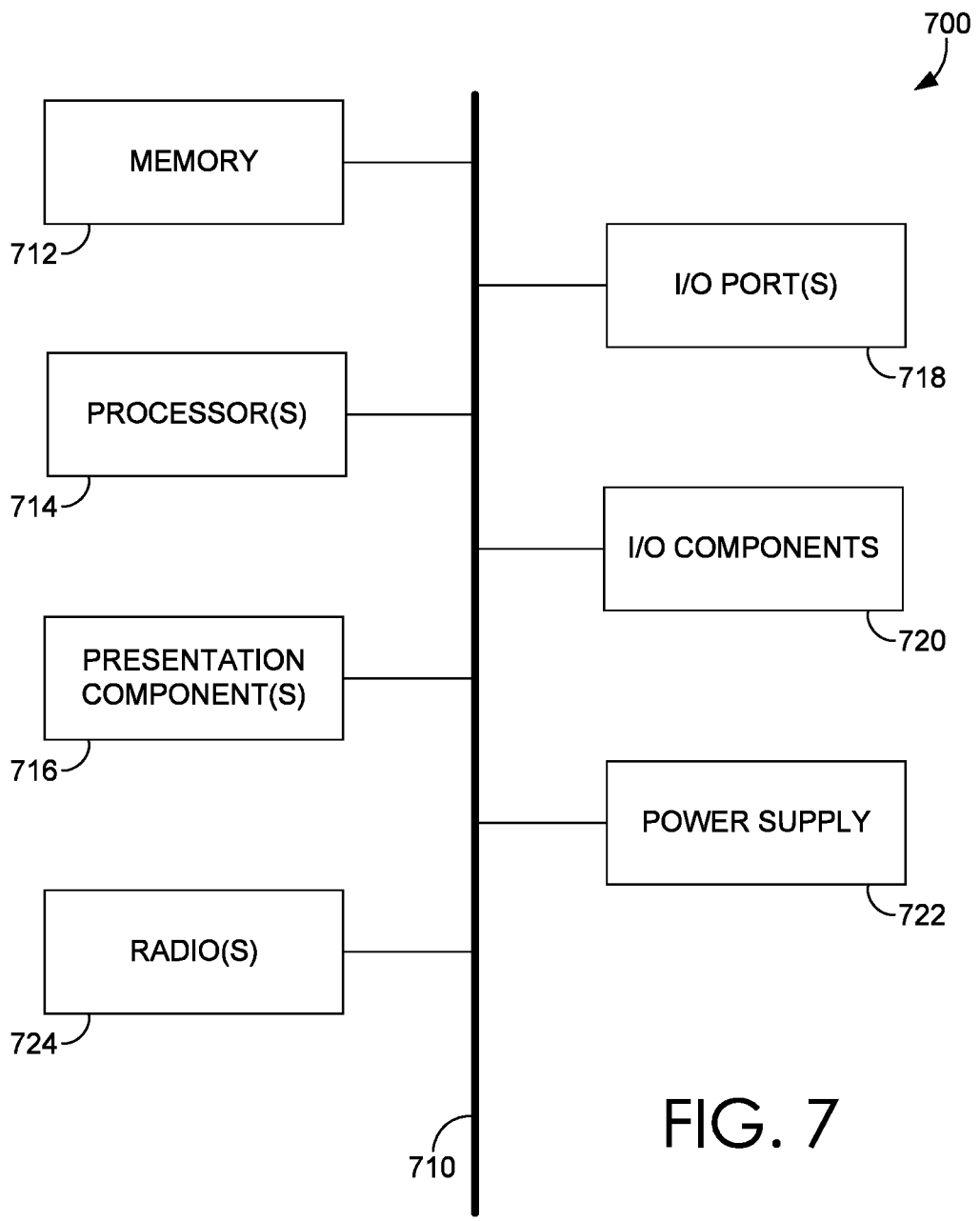
FIG. 7 is a block diagram of an exemplary computing environment suitable for use in implementing embodiments of the present invention.

Having described various embodiments of the invention, an exemplary computing environment suitable for implementing embodiments of the invention is now described. With reference to FIG. 7, an exemplary computing device is provided and referred to generally as computing device 700. The computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention can be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention can be practiced in a variety of system configurations, including handheld devices, consumer electronics, general-purpose computers, more specialty computing devices. Embodiments of the invention can also be practiced in distributed computing environments where tasks are performed by remote-processing devices that are linked through a communications network. In a distributed computing environment, program modules can be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what can be one or more buses (such as an address bus, data bus, or combination thereof). Although the various blocks of FIG. 7 are shown with lines for the sake of clarity, in reality, these blocks represent logical, not necessarily actual, components. For example, one can consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," "headset," head-mounted display," or "HMD," as all are contemplated within the scope of FIG. 7 and with reference to "computing device" or "user device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory can be removable, non-removable, or a combination thereof. Exemplary hardware devices include solid-state memory, hard drives, optical-disc drives. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which can be built in. Illustrative components include a microphone, joystick, game pad, satellite dish, scanner, printer, wireless device. The I/O components 720 can provide a natural user interface (NUI) that processes air gestures, voice, or other physiological inputs generated by a user. In some instances, inputs can be transmitted to an appropriate network element for further processing. An NUI can implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 can be equipped with depth cameras, such as stereoscopic camera systems, infrared camera systems, RGB camera systems, and combinations of these, for gesture detection and recognition. Additionally, the computing device 700 can be equipped with accelerometers, gyroscopes, magnetometers, and the like that enable detection of motion, position, rotation, and/or orientation. The output of the accelerometers, gyroscopes, or magnetometers can be provided to the display of the computing device 700 to render immersive augmented reality, mixed-reality, or virtual reality.

Some embodiments of computing device 700 can include one or more radio(s) 724 (or similar wireless communication components). The radio 724 transmits and receives radio or wireless communications. The computing device 700 can be a wireless terminal adapted to receive communications and media over various wireless networks. Computing device 700 can communicate via wireless protocols, such as code division multiple access ("CDMA"), global system for mobiles ("GSM"), or time division multiple access ("TDMA"), as well as others, to communicate with other devices. The radio communications can be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection can include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection can include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and can be employed without reference to other features and sub-combinations and are contemplated within the scope of the claims.

What is claimed is:

1. A system comprising:
a head-mounted display (HMD) coupled to at least one optical input device, a processor, and a computer storage medium storing instructions that, when used by the processor, cause the processor to:
generate, based on optical information obtained via the at least one optical input device at a first location, a first collection of three-dimensional datasets that corresponds to first detected physical properties of the first location;
generate, based on additional optical information obtained via the at least one optical input device at a second location, a second collection of three-dimensional datasets that corresponds to second detected physical properties of the second location;
segment a portion of the generated second collection of three-dimensional datasets corresponding to a physical object in the second location based on at least one of a determined correlation to an object from a dataset of known objects, a determined indication of strong geometry and/or features, and a completion of smooth geometry within the generated second collection of three-dimensional datasets;
display a first virtual representation of the physical object within a detected available space of a second virtual representation of the first location, the first virtual representation being rendered for display based on the segmented portion and the second virtual representation being rendered for display based on the generated first collection of three-dimensional datasets.

2. The system of claim 1, wherein the first virtual representation is rendered for display based on a received input corresponding to the segmented portion.

3. The system of claim 1,
wherein the generated first collection of three-dimensional datasets includes an environment geometry that defines at least one of the detected available space and detected occupied space of the first location, and
wherein the instructions further cause the processor to:
determine a position to render for display the first virtual representation within the second virtual representation based on the environment geometry included in the generated first collection of three-dimensional datasets.

4. The system of claim 1, wherein the instructions further cause the processor to:
modify the first and second virtual representations based on a reducing of dimensions of at least portions of the generated first and second collections of three-dimensional datasets, wherein the first virtual representation within the second virtual representation is rendered for display as a top-down view of the modified first virtual representation within the modified second virtual representation.

5. The system of claim 1, wherein the instructions further cause the processor to:
modify the displayed first virtual representation within the second virtual representation based on at least one illumination source detected by the at least one optical input device at the first location.

6. The system of claim 1, wherein the instructions further cause the processor to:
communicate the generated first collection of three-dimensional datasets to a remote server device, wherein the remote server device is configured to store the communicated first collection of three-dimensional datasets, and
wherein the first virtual representation is rendered for display based on a retrieval of the stored first collection of three-dimensional datasets from the remote server device.

7. The system of claim 1, wherein the instructions further cause the processor to:
communicate, to a second HMD, at least a portion of at least one of the generated first collection of three-dimensional datasets and the generated second collection of three-dimensional datasets.

8. A computer storage medium storing computer-useable instructions that, when used by one or more computing devices, cause the one or more computing devices to perform operations comprising:
generating a first collection of three-dimensional datasets that corresponds to first physical properties of a first location, the first physical properties being detected based on optical input data obtained at the first location;
generating a second collection of three-dimensional datasets that corresponds to second physical properties of a physical object located at a second location, the second physical properties being detected based on additional optical input data obtained at the second location; and
providing for display a first virtual representation of the physical object located within a detected available space of a second virtual representation of the first location based on the generated first and second collections of three-dimensional datasets, the first and second virtual representations being displayed to maintain the detected first and second physical properties of the physical object and first location, respectively.

9. The computer storage medium of claim 8, the operations further comprising:
generating a third collection of three-dimensional datasets that corresponds to third physical properties of another physical object located at a third location, the third physical properties being detected based on further optical input data obtained at the third location; and
providing for display the first virtual representation and a third virtual representation of the other physical object as overlays to detected available spaces of the first location when at the first location.

10. The computer storage medium of claim 8, wherein the first physical properties includes a detected illumination of the first location, and wherein the first virtual representation is adaptively displayed within the second virtual representation based on the detected illumination.

11. The computer storage medium of claim 8, wherein the generated first collection of three-dimensional datasets includes an environmental geometry that defines at least the detected available space of the first location, wherein the first virtual representation is positioned within the second virtual representation in accordance with the detected available space.

12. The computer storage medium of claim 8, the operations further comprising:
segmenting the physical object from the second location based on at least one of a determined correlation between the generated second collection of three-dimensional datasets to an object from a dataset of known objects, and a determined indication of strong geometry and/or features associated with the generated second collection of three-dimensional datasets.

13. The computer storage medium of claim 10, the operations further comprising:
providing for display the second virtual representation at a third location based on the generated first collection of three-dimensional datasets, the first virtual representation being displayed to maintain the detected physical properties of the first location; and
simultaneously providing for display, at the third location, the first virtual representation and a third virtual representation within one or more detected available spaces of the displayed second virtual representation based on the generated second collection and a generated third collection of three-dimensional datasets, wherein the first and third virtual representations are adaptively displayed based on the detected illumination of the first location.

14. A computer-implemented method for enabling collaboration between users in augmented reality environments, the method comprising:
generating, by a computing device coupled to a HMD, a first three-dimensional model that corresponds to a first location based on input data obtained by an optical input device coupled to the HMD at the first location;
providing for display, by the computing device via the HMD, the generated first three-dimensional model at a second location;
generating, by the computing device, a second three-dimensional model that corresponds to a physical object located in and segmented from the second location based on additional input data obtained by the optical input device at the second location;
providing for display, by the computing device via the HMD, the generated second three-dimensional model as one of an overlay to a detected available space of the first location when at the first location, or a virtual object within a corresponding detected available space of the generated first three-dimensional model.

15. The method of claim 14, further comprising:
transmitting, by the computing device, the generated second three-dimensional model to another computing device coupled to another HMD located at the first location, wherein the other computing device is configured to provide for display, via the other HMD, the transmitted second three-dimensional model as an overlay in the detected available space of the first location.

16. The method of claim 14, further comprising:
transmitting, by the computing device, the generated first three-dimensional model and the generated second three-dimensional model to another computing device coupled to another HMD located at a third location, wherein the other computing device is configured to provide for display, via the other HMD, the transmitted second three-dimensional model within the corresponding detected available space of the transmitted first three-dimensional model.

17. The method of claim 16, wherein the generated first three-dimensional model includes an illumination of the first location that is detected based on the obtained input data, wherein the transmitted second three-dimensional model is adaptively displayed within the transmitted first three-dimensional model based on the detected illumination of the first location.

* * * * *